(No Model.)
C. & J. CLOSZ.
OAT SCREEN.
No. 471,071. Patented Mar. 15, 1892.
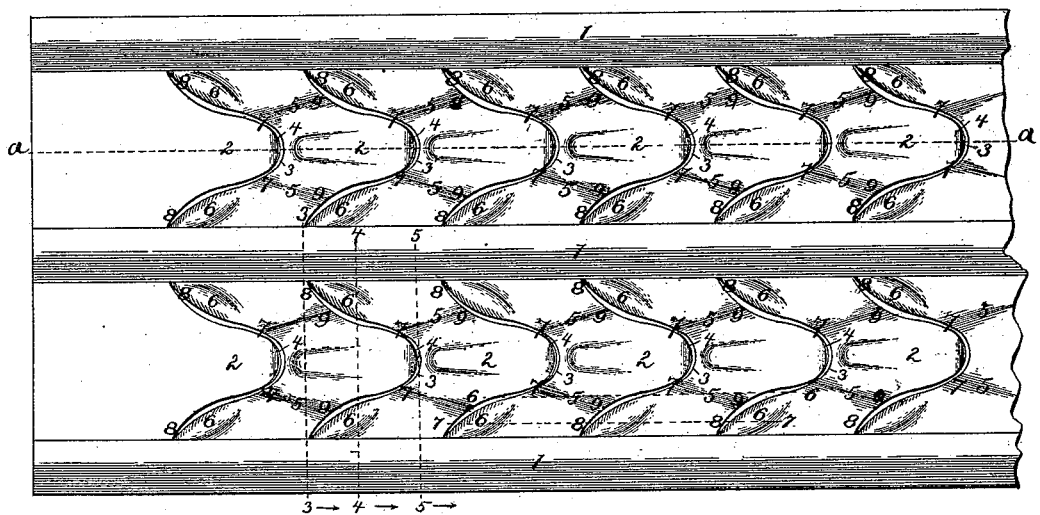
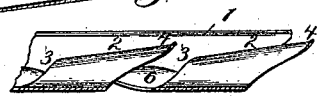
WITNESSES:  INVENTORS.

UNITED STATES PATENT OFFICE.

CHARLES CLOSZ AND JACOB CLOSZ, OF ST. ANSGAR, IOWA.

OAT-SCREEN.

SPECIFICATION forming part of Letters Patent No. 471,071, dated March 15, 1892.

Application filed June 25, 1891. Serial No. 397,463. (No model.)

*To all whom it may concern:*

Be it known that we, CHARLES CLOSZ and JACOB CLOSZ, citizens of the United States, residing at St. Ansgar, in the county of Mitchell and State of Iowa, have invented a certain new and useful Improvement in Oat-Screens, of which the following is a specification.

Special constructions of screens are required for the separation and cleaning of oats from other substances which come with it to the mill, and screens for this purpose have been made with perforations square, round, and oval and comparatively large, and in such constructions the separation from the oats of round substances—such as weed-heads, corn, and small bits of cob—are not possible, except, perhaps, to a very limited extent.

Our improvement is directed to a construction of sheet-metal-platform screen specially adapted for the cleaning and separation of oats and to prevent choking, as illustrated in the accompanying drawings, and in connection with which we shall point out the novel features in the claims concluding this specification.

Referring to the drawings, Figure 1 shows in top view so much of a shaking platform-screen as illustrates our invention therein. Fig. 2 is a vertical longitudinal section thereof on the line *a* of Fig. 1. Fig. 3 is a vertical detail cross-section on the line 3 of Fig. 1. Fig. 4 is a like view on the line 4 of Fig. 1. Fig. 5 is a like view on the line 5 of Fig. 1. Fig. 6 is a longitudinal detail section on the line 6 of Fig. 1. Fig. 7 is a like view on the line 7 of Fig. 1. Fig. 8 shows the opening looking into it toward the receiving end of the platform.

The platform, of suitable length and width, has its surface preferably formed of longitudinal corrugations 1, of V shape in cross-section and of such height and distance apart as to form channels between them, and within which the surface is formed with the peculiar openings and configurations by which it is adapted for the separation and cleaning of oats, and which constitutes the improvement claimed herein. The openings are made by a line cut of bell form, at suitable distances apart to permit the intermediate metal to be formed into raised convex bell-shaped tongues 2, standing forward toward the delivery end of the screen in line centrally between the corrugations, with the base of the opening terminating at or near the base of the corrugations. These bell-shaped tongues are made convex crosswise and stand inclined upward in the direction of the movement of the grain, so that their highest point is at the crown of the bell. These tongues extend from the edge of one opening to the edge of the other, so as to have a length greater than the extent of the line of cut which forms the bell-shaped opening. Under the crown or highest end of each bell-shaped tongue the convexity thereof is greatest and slopes downward to the edge 3, while at the crown the tongues are slightly flattened and turned up at 4. At the sides the tongues slope into surface tracks 5, which stand slightly oblique toward the corrugations between the bell-cuts, and form the lines of travel for the grain. At the base of the bell-shaped openings and between the oblique track-lines and the corrugations the surface is formed with almond-shaped elevations 6, which slope into the said oblique track-lines 5. These almond-shaped elevations stand along and in line with the edge of the bell-cut, and therefore at an angle to the line of the movement of the grain and to the oblique track-lines. This construction and relation of the oblique surface track-lines 5 and the oblique surface elevations 6 form a sort of zigzag channel, over and within which the grain moves along each side of the bell-tongues and over that part of the opening which we have designated as the "base" of the bell. The openings resulting from this construction, viewed with a bird's eye, are bell-shaped, but viewed sidewise and horizontally these openings present a fish-mouth or approximately wedge shape, in which the widest point on each side of the tongue is at the intersection 7 of the oblique tracks with the edge of the opening, which is just under the flattened and sloping sides of the bell-tongues. From this point 7 the opening decreases in width along the almond-shaped elevations 6 to a fissure 8, while toward and at the crown of the tongue the opening decreases from the point 7 to the center line just over the sloping inner end 3 of the tongue, as seen in Fig. 8.

The bell form of the tongues, their convex backs, and their flattened and turned-up crowns tend to and cause the oats to file out obliquely sidewise toward the corrugations, and in order to break up this file movement and turn the direction of the oats endwise and sidewise across the fissure end 8 of the opening into the oblique tracks 5 and into the openings which are largest at the points where these oblique tracks intersect said openings under the sides of the bell-shaped tongues the almond-shaped elevations 6 act to effect such turning and to change the direction of the file movement of the oats to bring them in position where they will pass freely through the openings at the points 7, as stated. These almond-shaped elevations co-operate with the bell-shaped tongues to form an elevated and smooth track for weeds, straw, and corn to travel on, raising them slightly on the almond-shaped elevations, while they incline over the opening where it is quite small on the sloping sides of the tongue, which acts as a guard to carry the moving stuff over the opening into the oblique tracks 5 on each side of the tongues. This surface construction has been found to give the free and fullest possible discharge of such matter and substances as ought to pass over the screen and at the same time provide the freest possible passage of the oats through the opening. The form of the openings and the way in which they are bounded and guarded prevent the lodging and clogging of any substance therein, and this gives a great advantage in the effective and satisfactory working of the screen in carrying off all matters too large and otherwise shaped as to prevent them from passing through or entering the openings, and without carrying with it the oats or grain.

The separator-platform is suitably mounted for use with proper separating appliances, and is best adapted for end shake; but it may be used with a side shake.

While we have obtained good and satisfactory results of less width opening at the crown of the bell, as stated, yet the openings need not necessarily be contracted at this point; but it is important that the openings be of greater width at the lines of the oblique tracks 5 under the tongues than at the base 8 of the bell-cut, over which the grain and other matters must pass with a sort of sidewise twisting movement.

The openings formed as described and the bell-shaped tongues having the relation set out thereto give a most effective cleaning action for the blast in the separation of oats, and will operate with good effect in cleaning wheat, rye, and barley, flax in thrashing-machines, and, with slight variations, for separating barley from oats.

The corrugations may be of any desired height to give rigidity to the platform; but they may only form ridges.

As stated, the base of the openings form fissures 8, which are intersected by the oblique tracks 5 at the points 9, where the surface is slightly above that edge of the cut which has the almond-shaped elevation 6, so that the grain and stuff is slightly raised as it moves over the fissures, and thereby allow the dust and fine stuff to pass down through the fissures. These fissures curve away from the sides of the tongues, so as to cross the tracks 5 at an oblique angle, and the openings viewed from the top at this point resemble a shallow crescent, one horn of which terminates at the lowest track-point 7, to which the oats are directed and where they are turned into the openings. The zigzag lines of the track and the relation thereto of the raised tongues on one side and the elevations 6 on the other side co-operate to render very effective the movement of the body of the grain over certain parts of the openings and to carry off the matters from which the oats are separated.

The lines 5 5 of track are formed in the lowest surface-level between the sloping sides of the tongues and the sloping sides of the oblong elevations 6, and from the latter the surface inclines slightly to the next succeeding opening at the point 9.

We claim as our improvement—

1. A sheet-metal-platform screen formed with openings of bell shape supplemented by raised tongues of corresponding form, the openings and the tongues terminating in fissures extending diagonally across the lines of the travel of the grain, for the purpose stated.

2. A sheet-metal-platform screen formed with openings of bell shape supplemented by raised tongues of corresponding form, the openings and the tongues terminating in fissures extending diagonally across the lines of the travel of the grain and bounded by oblique elevations 6 at that edge of the fissure next the delivering end of said platform, for the purpose stated.

3. A sheet-metal-platform screen formed with openings of bell shape supplemented by raised tongues of corresponding form and having oblique surface track-lines 5 5, intersecting the opening at the sides 7 of and under the crown of the bell, for the purpose stated.

4. A sheet-metal platform having a screening-surface of bell-shaped openings, bell-shaped tongues supplementing the openings, oblique surface lines of travel 5 5, intersecting the openings at their narrowest and at their widest points 9 and 7, and the oblique elevations 6, bounding the openings at their narrowest points 9 and terminating in the oblique tracks at the widest points of said openings, for the purpose stated.

5. A screen for grain-separators, constructed of a sheet-metal platform formed with bell-shaped openings, and bell-shaped tongues supplementing said openings and forming therewith oblique fissures 8, extending across the lines of travel of the grain, and openings of approximately wedge shape extending toward the delivery end of the screen and having their greatest width in the lines of travel at points between the base fissures and the highest point 4 of the tongue, for the purpose stated.

6. A screen for grain-separators, constructed of a sheet-metal platform corrugated and having lines of bell-shaped openings, and bell-shaped tongues supplementing said openings and terminating in crescent fissures along the base of said corrugations, the oblique surface lines 5 5, the oblique surface elevations 6, terminating in said track-lines, the openings formed by said tongues having approximately wedge shape, and extending from the crescent-fissures with a variable width to the crown of the bell, for the purpose stated.

7. An oat-screen consisting of a sheet-metal platform formed with parallel longitudinal rows of bell-shaped openings or cuts, supplemented by tongues having transversely-convex backs standing in the line of the flow of the grain in substantially horizontal planes, extending from the crown of the tongue to the crown of the opening or cut, for the purpose stated.

8. A sheet-metal-platform screen formed with openings of bell shape, supplemented by raised tongues of corresponding form, the space between the edges which form the openings having curved wedge shape increasing in width toward the forward end of the opening and having the greatest width in the channel between the forward outer sides of the tongues and the oblique surface lines of travel 5 5, for the purpose stated.

In testimony whereof we have signed this specification in the presence of two subscribing witnesses.

CHARLES CLOSZ.
JACOB CLOSZ.

Witnesses:
MARTIN MOE,
JEFF. TOLLEFSON.